(12) United States Patent
Lee

(10) Patent No.: US 7,808,571 B2
(45) Date of Patent: Oct. 5, 2010

(54) LIQUID CRYSTAL DISPLAY DEVICE

(75) Inventor: Seung-Hwan Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 539 days.

(21) Appl. No.: 11/640,346

(22) Filed: Dec. 18, 2006

(65) Prior Publication Data

US 2010/0225843 A1    Sep. 9, 2010

(30) Foreign Application Priority Data

Jun. 30, 2006    (KR)    ........................ 10-2006-0061479

(51) Int. Cl.
    *G02F 1/1333*    (2006.01)
(52) U.S. Cl. ........................... 349/58; 349/59; 361/681; 361/679.21
(58) Field of Classification Search ................... 349/58, 349/59
    See application file for complete search history.

(56) References Cited

U.S. PATENT DOCUMENTS

| | | | |
|---|---|---|---|
| 6,587,166 B1 | 7/2003 | Lee et al. | |
| 6,593,979 B1 * | 7/2003 | Ha et al. | 349/58 |
| 6,847,417 B2 * | 1/2005 | Kim | 349/58 |
| 7,196,750 B2 * | 3/2007 | Koo et al. | 349/59 |
| 7,254,013 B2 * | 8/2007 | Tatsukami et al. | 361/679.27 |
| 7,474,364 B2 * | 1/2009 | Won et al. | 349/58 |
| 7,477,339 B2 * | 1/2009 | Kim et al. | 349/58 |
| 7,545,457 B2 * | 6/2009 | Park | 349/58 |
| 7,646,447 B2 * | 1/2010 | Kim et al. | 349/58 |
| 2004/0252254 A1 * | 12/2004 | Koo et al. | 349/58 |
| 2005/0062900 A1 * | 3/2005 | Kim | 349/58 |
| 2005/0105011 A1 * | 5/2005 | An | 349/58 |
| 2006/0103774 A1 * | 5/2006 | Han et al. | 349/58 |
| 2007/0046852 A1 * | 3/2007 | Kim et al. | 349/58 |
| 2007/0052877 A1 * | 3/2007 | Heo | 349/33 |

* cited by examiner

*Primary Examiner*—David Nelms
*Assistant Examiner*—Thanh-Nhan P Nguyen
(74) *Attorney, Agent, or Firm*—Morgan Lewis & Bockius LLP

(57) ABSTRACT

A liquid crystal display (LCD) device includes an LCD panel to display images, a backlight unit to supply light to the LCD panel, a frame provided with an inverter to supply an alternating current of a high voltage to the lamp, and an inverter cover engaged with the frame to receive the inverter.

17 Claims, 6 Drawing Sheets

LIQUID CRYSTAL DISPLAY DEVICE

This application claims the benefit of Korean Application No. 10-2006-061479, filed in Korea on Jun. 30, 2006, which is herein expressly incorporated by reference.

BACKGROUND OF THE INVENTION

1. Field of the Invention

The present invention relates to a liquid crystal display (LCD) device, and more particularly, to an LCD device having an improved inverter cover structure.

2. Background of the Related Art

Recently, liquid crystal display (hereinafter, referred to as "LCD") devices have attracted considerable attention because the LCD devices are capable of displaying high quality picture images. Also, with the improvement of liquid crystal and minute pixel processing technology, the LCD devices are made with the advantage of thin profiles, light weights, and low power consumption. Moreover, the application fields of the LCD device have been greatly expanded.

In general, the LCD device mainly includes a liquid crystal module that includes an LCD panel having lower and upper glass substrates and a liquid crystal material injected between the lower and upper glass substrates. The liquid crystal panel also includes lower and upper polarizing plates for polarizing light on the lower and upper surfaces, and a backlight unit having a light guide plate and a light source for providing light to the LCD panel. The liquid crystal module displays a video signal input from an external source. Also, the LCD device includes a driving part for driving the liquid crystal module and a system case.

An LCD device will be described with reference to FIG. 1. FIG. 1 is an exploded perspective view schematically illustrating a liquid crystal module 10 according to the related art. As shown in FIG. 1, the liquid crystal module 10 includes an LCD panel 11 and a backlight unit 12. The LCD panel 11 and the backlight unit 12 are supported by a main support 13 and a top case 20. The main support 13 is made of a plastic material, and the top case 20 is made of a metal material. The LCD panel 11 is provided with an upper polarizing plate 11a and a lower polarizing plate 11b. The backlight unit 12 includes a reflecting plate 12a, a light guiding plate 12b, a first diffusion or protective sheet 12c, a first prism sheet 12d, a second prism sheet 12e, and a second diffusion or protective sheet 12f, which are sequentially formed on the main support 13. The top case 20 is connected to the upper side of the LCD panel 11. The backlight unit 12 is supported by the support main 13. Moreover, a cover bottom 14 is provided below the main support 13 to firmly support the main support 13 and to radiate heat generated from a light source.

FIG. 2 is a plane view schematically illustrating an inverter cover that is fixed to the related art LCD module. Since the LCD panel 11 does not emit light, a light source such as a cold cathode fluorescent lamp (CCFL) (not shown) is provided in the backlight unit 12 to uniformly emit light toward a display area of the LCD panel 11. As shown in FIG. 2, since an alternating current is used as an electric energy for driving the CCFL, an inverter 15, which converts an electric energy of a direct current supplied from an external power source into an alternating current, is received by an inverter cover 16. The inverter cover 16 having the inverter 15 is provided on a rear surface of the cover bottom 14.

However, such an inverter cover structure of the related art LCD module has the following problems. Referring to FIG. 2, the inverter cover 16 is fastened to the cover bottom 14 by screws 17 and also is attached to the cover bottom 14 by a double sided tape 18. Since this fitting manner using a screw and/or a double sided tape is complicated and requires much manual work, the productivity is decreased and the costs are increased. Also, since the inverter cover 16 is attached to the cover bottom 14 by the double sided tape 18, it is not easy to detach the inverter cover 16 from the cover bottom 14 in the event that the inverter cover 16 needs to be detached from the cover bottom 14 for testing. Moreover, the inverter cover 16 may be damaged when the inverter cover 16 is detached from the cover bottom 14.

SUMMARY OF THE INVENTION

Therefore, an object of the present invention is to provide an LCD device having an improved inverter cover structure, in which an inverter cover is able to be easily fixed to a cover bottom, thereby enhancing productivity and reducing the costs.

Another object of the present invention is to provide an LCD device having an improved inverter cover structure, in which an inverter cover is able to be easily detached from a cover bottom, thereby improving production yields.

To achieve these and other advantages and in accordance with the purpose of the present invention, as embodied and broadly described herein, the LCD device includes an LCD panel to display images, a backlight unit to supply light to the LCD panel, a frame provided with an inverter to supply an alternating current to the backlight unit, and an inverter cover engaged with the frame to receive the inverter.

In another aspect of the present invention, the LCD device includes an LCD panel to display images, a backlight unit to supply light to the LCD panel, a bottom support provided with an inverter to supply an alternating current to the backlight unit, and an inverter cover engaged with the bottom support to receive the inverter.

In another aspect of the present invention, the LCD device includes an LCD panel to display images, a backlight unit to supply light to the LCD panel, a bottom cover provided with an inverter to supply an alternating current to the backlight unit, and an inverter cover engaged with the bottom cover to receive the inverter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
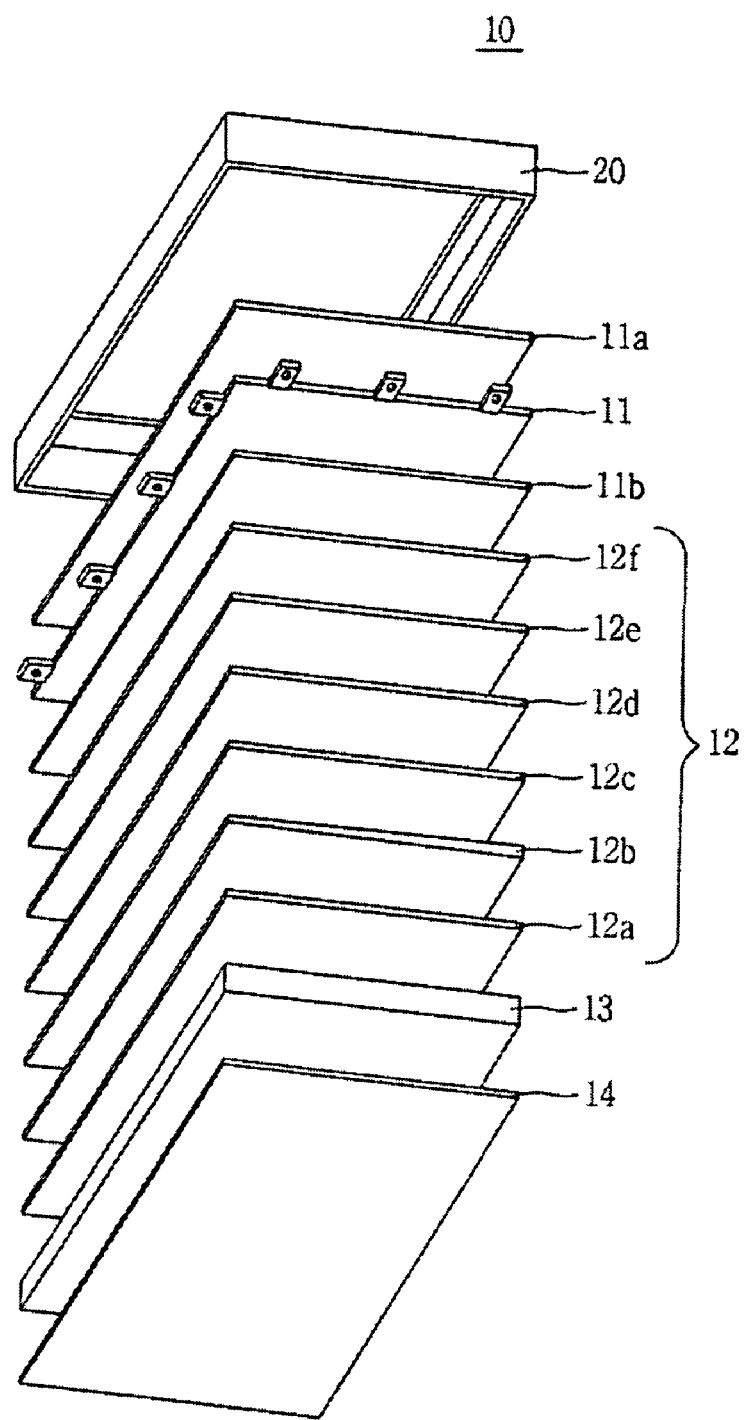
FIG. 1 is an exploded perspective view schematically illustrating an LCD module according to the related art.
Figure 2:
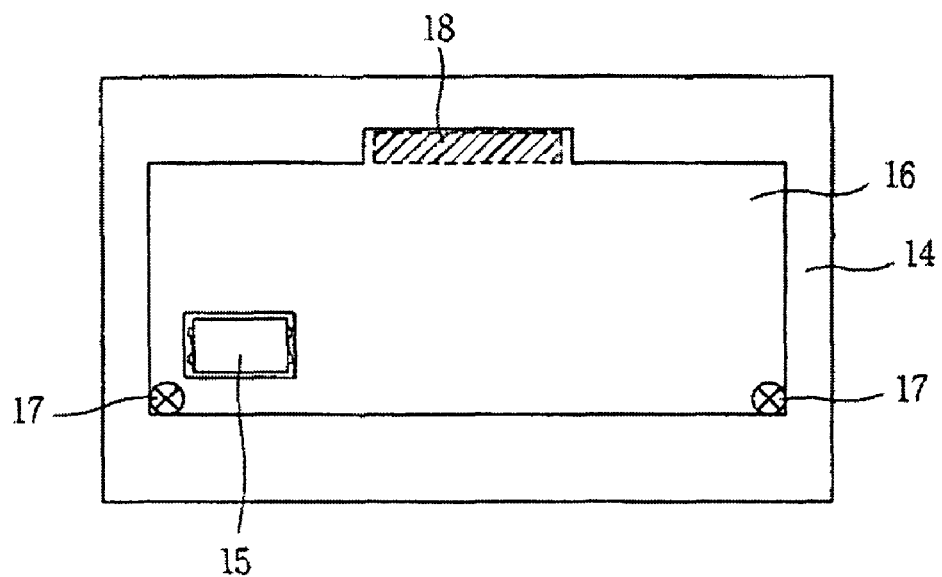
FIG. 2 is a plane view schematically illustrating inverter cover that is fixed to the related art LCD module.

Reference will now be made in detail to the preferred embodiments of the present invention, examples of which are illustrated in the accompanying drawings. The same reference numerals will be used throughout the drawings to refer to the same parts as those of the related art.

Figure 3:
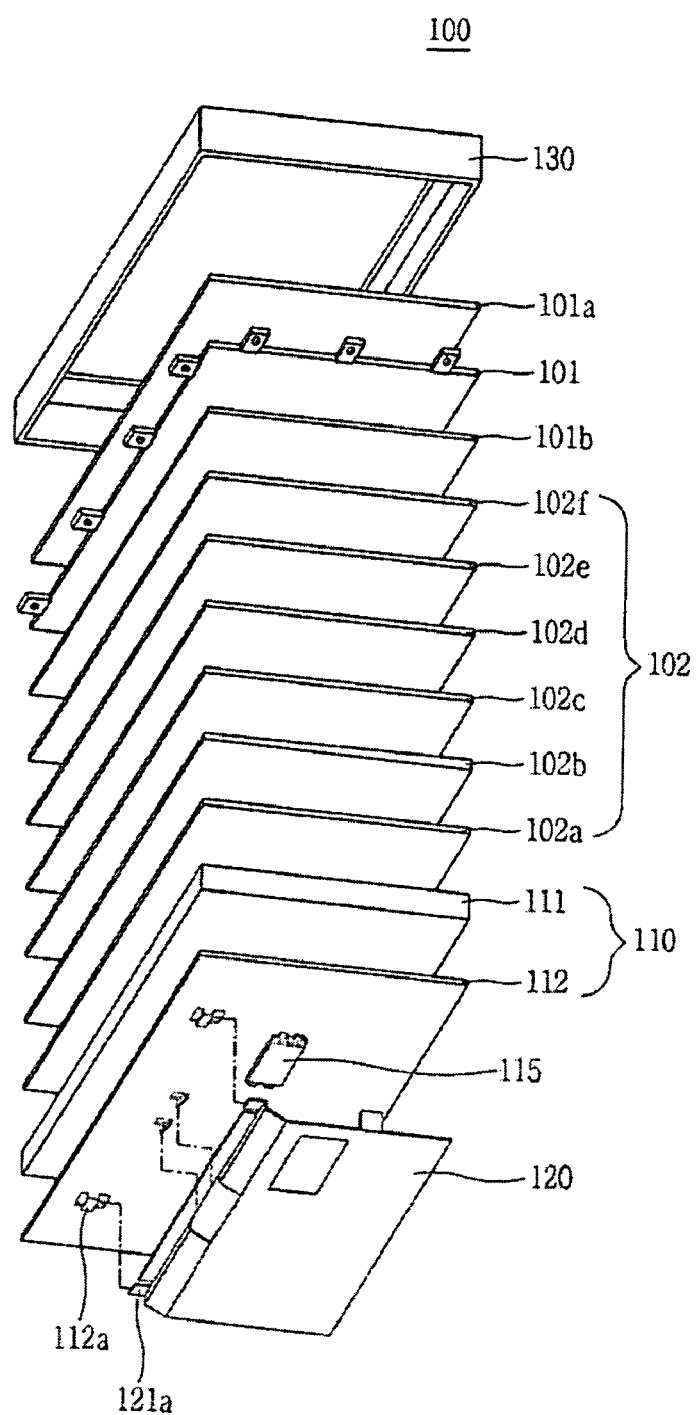
FIG. 3 is an exploded perspective view schematically illustrating an LCD module according to an exemplary embodiment of the present invention.
Figure 4:
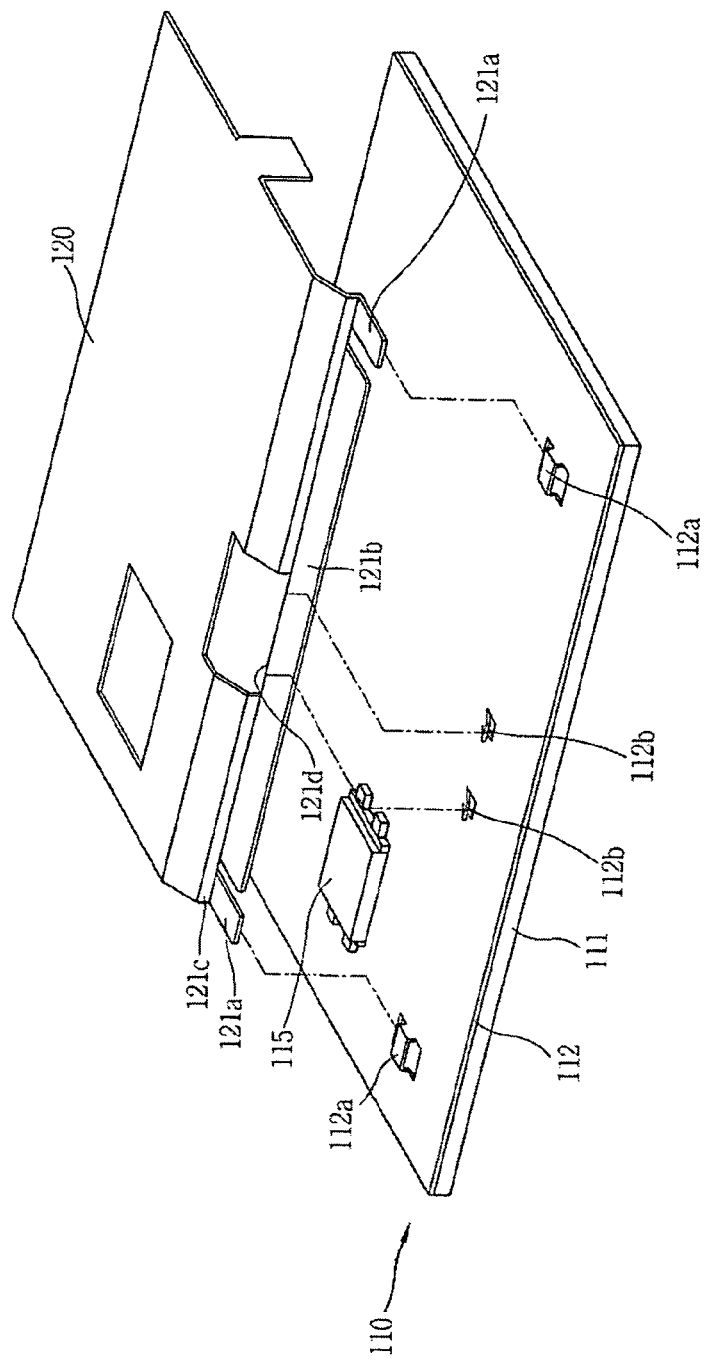
FIG. 4 is an exploded perspective view schematically illustrating an inverter cover that is fixed to the LCD module according to the exemplary embodiment of the present invention.
Figure 5:
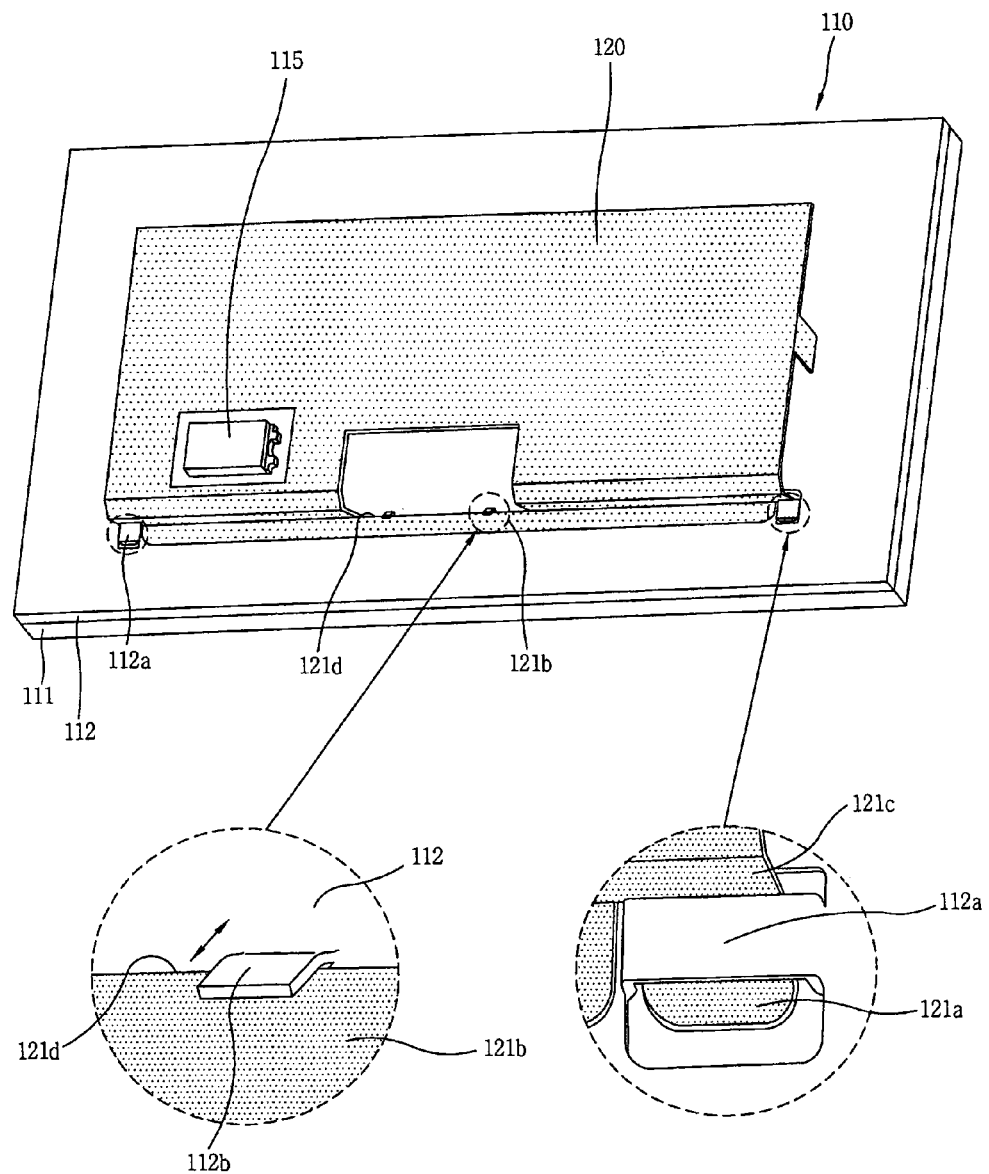
FIG. 5 is a perspective view schematically illustrating an inverter cover that is fixed to the LCD module according to the exemplary embodiment of the present invention.
Figure 6:
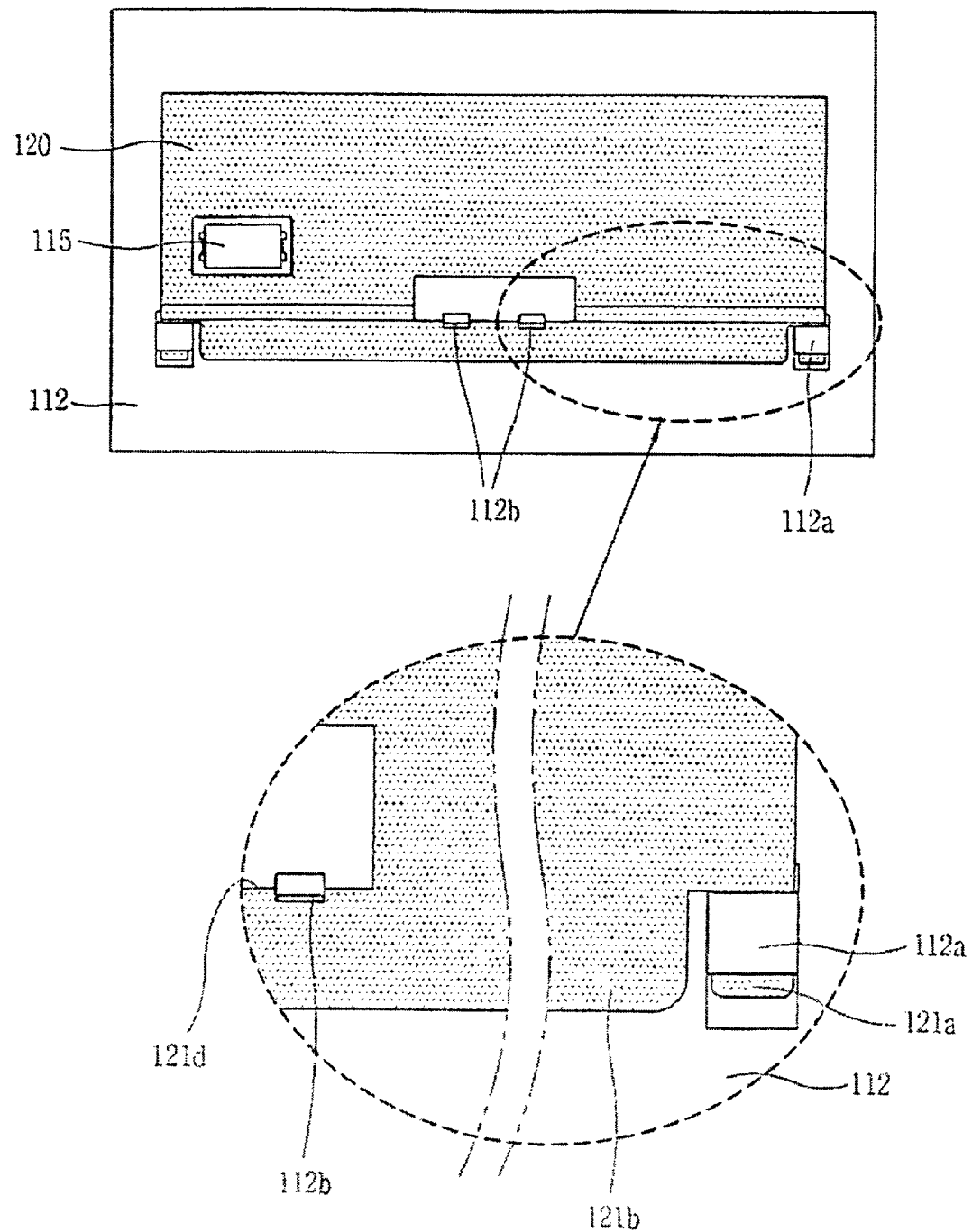
FIG. 6 is a plane view illustrating an inverter cover that is fixed to the LCD module according to the exemplary embodiment of the present invention.

FIG. 3 is an exploded perspective view schematically illustrating an LCD module according to an exemplary embodiment of the present invention, FIG. 4 is an exploded perspective view schematically illustrating an inverter cover that is fixed to the LCD module according to the exemplary embodiment of the present invention, FIG. 5 is a perspective view schematically illustrating an inverter cover that is fixed to the LCD module according to the exemplary embodiment of the present invention, and FIG. 6 is a plane view schematically illustrating an inverter cover that is fixed to an LCD module according to the exemplary embodiment of the present invention.

As shown in FIG. 3, an LCD module 100 includes an LCD panel 101 that displays images, a backlight unit 102 that is provided below the LCD panel 101 to irradiate light to a rear surface of the LCD panel 101, a top case 130 that is provided above the LCD panel 101 to surround the LCD panel 101, a bottom support 110 that is provided below the backlight unit 102 to support the backlight unit 102, and an inverter cover 120, which receives an inverter 115, is provided on a rear surface of the bottom support 110 and engaged with the bottom support 110. The backlight unit 102 includes a light source (not shown), such as CCFL (cold cathode fluorescent lamp) or EEFL (external electrode fluorescent lamp). The light source serves to uniformly emit light toward a display area of the LCD panel 101. The inverter 115 serves to apply an alternating current of a high voltage to the light source, and is provided on a cover bottom 112 of the bottom support 110.

As shown in FIGS. 3, 4 and 5, the bottom support 110 includes a main support 111 fixed to the bottom of the backlight unit 102 to support the backlight unit 102, and the cover bottom 112 fixed to the bottom of the main support 111 to firmly maintain a lower support structure and to radiate heat generated from the light source. In this exemplary embodiment, the cover bottom 112 includes first supports 112a and second supports 112b, which are formed in one side of the cover bottom 112. The inverter cover 120 includes first hooks 121a corresponding to the first supports 112a, respectively, and a second hook 121b corresponding to the second supports 112b.

Specifically, the first supports 112a are formed at the ends of the one side of the cover bottom 112, and are each shaped like a slot in a width direction to receive the respective first hooks 121a in a thickness direction. The second supports 112b are formed between the first supports 112a, and are protruded in a thickness direction to engage with the second hook 121b in an advance and retreat direction (That is, in an engagement direction orthogonal to a width direction of the inverter cover).

Moreover, the first supports 112a of the cover bottom 112 are formed by cutting in a width direction using a pressing process, and then are bent toward a bottom direction (inverter direction) to form like the slot. Thus, as shown in FIG. 5 or 6, the first hooks 121a of the inverter cover 120 are able to be inserted into the first supports 112a, respectively. Also, as shown in FIGS. 4 and 5, the second supports 112b of the cover bottom 112 are shaped like a latch, which are also formed by the cutting and pressing process during plane projection to lift inner sides of the second supports 112b, thereby protruding like a latch. Preferably, the second supports 112b of the cover bottom 112 are inclined in an entry direction, so that the inverter cover 120 can slide into the cover bottom 112 by engaging the first and second supports 112a and 112b with the first and second hooks 121a and 121b, respectively.

As shown in FIGS. 3 and 4, the first hooks 121a of the inverter cover 120 are formed, corresponding to the first supports 112a, at the ends of one side of the inverter cover 120. The first hooks 121a are formed in a slit shape, so that the first hooks 121a can be inserted into the respective first supports 112a, which are formed in a slot shape, in an entry direction. Thus the first hooks 121a are supported by the first supports 112a in a thickness direction of the cover bottom 112. One portion in the middle of the one side of the inverter cover 120, which portion corresponds to the second supports 112b of the cover bottom 112, is cut to form the second hook 121b having a slit shape in a width direction. Thus, as shown in FIGS. 4 and 5, the second supports 112b of the cover bottom 112 can support the inverter cover 120 by sliding the inverter cover 120 to engage the second supports 112b with the second hook 121b in an entry direction.

After the first hooks 121a are inserted into the respective first supports 112a, their cut ends are hooked and fixed in the first supports 112a so that the first hooks 121a do not enter the first supports 112a any longer. Alternatively, as shown in FIG. 4 for example, the one side of the inverter cover 120 may be bent toward the cover bottom 112 to form a bent step surface 121c. Thus, the bent step surface 121c may be hooked in the first supports 112a so that the first hooks 121a may not enter the first supports 112a any longer.

Preferably, as shown in FIGS. 5 and 6, to firmly fix the inverter cover 120 to the cover bottom 112, the step surface 121c (of FIGS. 4 and 5) of the first hooks 121a is tightly adhered to opposing surfaces of the first supports 112a, while the second supports 112b are tightly adhered to a cut surface 121d of the second hook 121b. To this end, it is preferable that the first supports 112a and the second supports 112b are disposed in a straight line in the width direction. Meanwhile, the step surface 121c of the first hooks 121a and the cut surface 121d of the second hook 121b are disposed in a straight line in the width direction. Even if the first supports 112a and the second supports 112b are not disposed in a straight line and the first hooks 121a and the second hook 121b are not disposed in a straight line, each support and each hook may be disposed in some manner, by which they can simultaneously be engaged with each other.

The process step of fixing the inverter cover to the cover bottom in the LCD device according to an exemplary embodiment of the present invention will be described. In a state that the first hooks 121a at the ends of one side of the inverter cover 120 are arranged corresponding to the first supports 112a at the end of one side of the cover bottom 112, the inverter cover 120 is pushed, thereby inserting the first hooks 121a into the first supports 112a, respectively. Meanwhile, the second hook 121b of the inverter cover 120 is received and kept by the second supports 112b of the cover bottom 112. Afterwards, if the first hooks 121a of the inverter cover 120 enter the first supports 112a at a certain angle, ends of cut surfaces of the first hooks 121a and the step surface 121c are hooked in the sides of the first supports 112a along an entry direction, thereby preventing the first hooks 121a from entering the first supports 112a any longer. Meanwhile, the cut surface 121d of the second hook 121b is hooked in the bent surfaces of the second supports 112b, thereby preventing the second hook 121b from being detached from the second supports 112b. Thus, the inverter cover 120 is stably fixed to the cover bottom 112 in an advance and retreat direction.

Although the supports and the hooks are only formed at one side in the entry direction in the aforementioned exemplary embodiment, they are not limited to this exemplary arrangement. In other words, the supports and the hooks may be formed at all sides in another exemplary embodiment as long as the supports and the hooks can be engaged with each other. Since the supports and the hooks in another exemplary embodiment are substantially the same as those of the aforementioned exemplary embodiment, a detailed description thereof will be omitted.

The LCD device having an inverter cover structure according to the present invention has the following advantages. Since a separate double sided tape or a screw is not required to fix the inverter cover to the cover bottom, the assembly process of the inverter cover is shortened, thereby improving productivity and saving the costs. Moreover, since no double sided tape is used, the inverter cover can easily be detached from the cover bottom for testing, thereby reducing the maintenance costs.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
an LCD panel to display image;
a backlight unit to supply light to the LCD panel;
a frame provided with an inverter to supply an alternating current to the backlight unit, wherein the frame includes first supports to support an inverter cover in a thickness direction, and second supports between the first supports to support the inverter cover in a retreat direction, and wherein the inverter cover includes first hooks corresponding to the first supports to be engaged with the frame in a thickness direction, and a second hook corresponding to the second supports to be engaged with the frame in a retreat direction so that the first hooks of the inverter cover are inserted into the first supports and the second hook of the inverter cover is supported in the bottom support by the second supports; and
wherein the inverter cover is engaged with the frame to receive the inverter.

2. The LCD device as claimed in claim 1, wherein the frame includes at least one first support, and the inverter cover includes at least one first hook that is inserted into the at least one first support or the frame.

3. The LCD device as claimed in claim 2, wherein the first hook is stepped to limit an insertion depth of the inverter cover.

4. The LCD device as claimed in claim 1, wherein the frame includes at least one second support protruded in a thickness direction, and the inverter cover includes at least one second hook cut in a slit shape, such that the at least one second hook is engaged with the second support of the frame.

5. The LCD device as claimed in claim 4, wherein the second support is inclined in an entry direction of the inverter cover.

6. A liquid crystal display (LCD) device, comprising:
an LCD panel to display images;
a backlight unit to supply light to the LCD panel;
a bottom support provided with an inverter to supply an alternating current to the backlight unit, wherein the bottom support includes first supports to support an inverter cover in a thickness direction, and second supports protruded between the first supports so that the inverter cover is hooked and supported in the second support; and
wherein the inverter cover is engaged with the bottom support to receive the inverter, and the inverter cover includes first hooks corresponding to the first supports to be engaged in the bottom support and a second hook corresponding to the second supports in a slit shape between the first hooks so that the first hooks of the inverter cover are inserted into the first supports and the second hook of the inverter cover is supported in the bottom support by the second supports.

7. The LCD device as claimed in claim 6, wherein the bottom support includes at least one first support, and the inverter cover includes at least one first hook that is inserted into the at least one first support of the bottom support.

8. The LCD device as claimed in claim 7, wherein the first hook is stepped to limit an insertion depth of the inverter cover.

9. The LCD device as claimed in claim 6, wherein the bottom support includes at least one second support protruded in a thickness direction, and the inverter cover includes at least one second hook cut in a slit shape to be hooked in the second support of the bottom support and supported in a retreat direction.

10. The LCD device as claimed in claim 6, wherein the second support is inclined from its start end to its end in an entry direction of the inverter cover.

11. The LCD device as claimed in claim 6, wherein the bottom support includes a main support and a bottom cover.

12. A liquid crystal display (LCD) device, comprising:
an LCD panel to display images;
a backlight unit to supply light to the LCD panel;
a bottom cover provided with an inverter to supply an alternating current to the backlight unit, wherein the bottom cover includes first supports to support an inverter cover in a thickness direction, and second supports protruded between the first supports so that the first hooks of the inverter cover are inserted into the first supports and the second hook of the inverter cover is supported in the second support in a retreat direction by the second supports; and
wherein the inverter cover engaged with the bottom cover to receive the inverter.

13. The LCD device as claimed in claim 12, wherein the inverter cover includes at least one hook to be supported in the bottom cover in a thickness direction, and at least one second support in a slit shape between the first hooks so that the inverter cover is hooked and supported in the bottom cover in a retreat direction.

14. The LCD device as claimed in claim 12, wherein the bottom cover includes at least one first support, and the inverter cover includes at least one first hook inserted into the first support of the bottom cover to be supported in a thickness direction.

15. The LCD device as claimed in claim 14, wherein the first hook is stepped to limit an insertion depth of the inverter cover.

16. The LCD device as claimed in claim 12, wherein the bottom cover includes at least one second support protruded in a thickness direction, and the inverter cover is provided with at least one second hook cut in a slit shape to be hooked in the second support of the bottom cover and supported in a retreat direction.

17. The LCD device as claimed in claim 12, wherein the second support is inclined from its start end to its end in an entry direction of the inverter cover.

* * * * *